(12) United States Patent
Morten (10) Patent No.: US 7,007,170 B2
(45) Date of Patent: Feb. 28, 2006

(54) SYSTEM, METHOD, AND APPARATUS FOR SECURELY PROVIDING CONTENT VIEWABLE ON A SECURE DEVICE

(75) Inventor: Glenn A. Morten, Bellevue, WA (US)

(73) Assignee: Widevine Technologies, Inc., Seattle, WA (US)

( * ) Notice: Subject to any disclaimer, the term of this patent is extended or adjusted under 35 U.S.C. 154(b) by 0 days.

(21) Appl. No.: 10/760,642

(22) Filed: Jan. 20, 2004

(65) Prior Publication Data

US 2004/0184616 A1  Sep. 23, 2004

Related U.S. Application Data

(60) Provisional application No. 60/455,723, filed on Mar. 18, 2003.

(51) Int. Cl.
*G06F 11/30* (2006.01)
*H04L 9/00* (2006.01)

(52) U.S. Cl. ............ 713/193; 705/57; 380/201; 380/281; 380/282; 380/284; 380/285

(58) Field of Classification Search ........... 713/193; 380/45, 282, 285
See application file for complete search history.

(56) References Cited

U.S. PATENT DOCUMENTS

| | | |
|---|---|---|
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |

(Continued)

FOREIGN PATENT DOCUMENTS

EP 658054 B1 6/1995

(Continued)

OTHER PUBLICATIONS http://www.ntt.co.jp/news/news02e/0209/020927.html, Sep. 27, 2002.

(Continued)

*Primary Examiner*—Kambiz Zand
(74) *Attorney, Agent, or Firm*—Darby & Darby PC; Jamie L. Wiegand (57) ABSTRACT

A system, apparatus, and method are directed to providing and securely viewing secure content. In one embodiment, a secure player provides secure screening/previewing of secure content, such as a motion picture, by a member of an awards organization. A content key is employed to selectively encrypt at least a portion of a content stream. The content key is encrypted with a screener key. The encrypted content key is embedded into the secure content. The screener key is encrypted using public/private key pair that is bound to the secure player. The secure content may be distributed on a medium, such as a DVD, high definition DVD, and the like. The secure player is configured to receive the medium, screener key, and a screener identity. The screener identity and screener key are employed by the secure player to decrypt and enable secure viewing of the content.

38 Claims, 7 Drawing Sheets

U.S. PATENT DOCUMENTS

| | | |
|---|---|---|
| 5,774,546 A | 6/1998 | Handelman et al. |
| 5,799,089 A | 8/1998 | Kuhn et al. |
| 5,805,705 A | 9/1998 | Gray et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,160,891 A * | 12/2000 | Al-Salqan ................... 380/286 |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 * | 5/2001 | Downs et al. ................. 705/1 |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,314,409 B1 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B1 | 6/2002 | Kawagishi |
| 6,409,089 B1 | 6/2002 | Eskicioglu |
| 6,427,140 B1 | 7/2002 | Ginter et al. |
| 6,449,367 B1 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B1 | 10/2003 | Handelmann |
| 6,640,304 B1 | 10/2003 | Ginter et al. |
| 6,651,170 B1 | 11/2003 | Rix |
| 6,654,420 B1 | 11/2003 | Snook |
| 6,654,423 B1 | 11/2003 | Jeong et al. |
| 6,658,568 B1 | 12/2003 | Ginter et al. |
| 6,668,325 B1 | 12/2003 | Collberg et al. |
| 6,792,113 B1 * | 9/2004 | Ansell et al. ................ 380/284 |
| 2003/0007568 A1 | 1/2003 | Hamery et al. |

FOREIGN PATENT DOCUMENTS

| | | |
|---|---|---|
| EP | 714204 B1 | 5/1996 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-02/21761 A2 | 3/2002 |

OTHER PUBLICATIONS

Coverage and Generalization in an Artificial Immune System, Balthrop, et al., 2002.

Video Protection by Partial Content Corruption, C. Griwodz, Sep. 1998.

An Overview of Multimedia Content Protection in Consumer Electronics Devices, Eskicioglu et al.

Performance Study of a Selective Encryption Scheme for the Security of Networked, Real-Time Video, Spanos et al., 1995.

Goonatilake, Suran, ed. et al., Intelligent Systems for Finance and Business, 1995, chapters 2-10, pp. 31-173.

Irdeto Access and Optibase create Strategic Alliance—Dec. 14, 2000, http://www.irdetoaccess.com/press/0000041.htm.

System Security, Streaming Media, S. Blumenfeld, Oct. 2001.

http://www.cs.unm.edu/~forest/projects.html, Dec. 2, 2003.

Partial Encryption for Image and Video Communication, H. Cheng, 1998.

A Review of Video Streaming Over the Internet, Hunter et al., Dec. 2, 2003.

Standards Track, Schulzrinne, et al., Apr. 1998, pp. 1-86.

http://www.optibase.com/html/news/December_14_2000.html, Dec. 14, 2004.

Omneon Video Networks Product Announcement, Broadband Streaming, pp. 1-4.

Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

* cited by examiner

SYSTEM, METHOD, AND APPARATUS FOR SECURELY PROVIDING CONTENT VIEWABLE ON A SECURE DEVICE

CROSS REFERENCE TO RELATED APPLICATIONS

This application claims the benefit of U.S. Provisional Application Ser. No. 60/455,723, filed Mar. 18, 2003, the benefit of the earlier filing date of which is hereby claimed under 35 U.S.C. § 119 (e).

FIELD OF THE INVENTION

The present invention relates to data security, and more particularly, to a system, and method, and apparatus for providing and securely playing secure content.

BACKGROUND OF THE INVENTION

Digital Versatile Discs (DVDs) are potentially the fastest growing and most rapidly adopted consumer electronics product of today. Interestingly, one of the main reasons that the DVD format is so innovative and attractive to consumers and the entertainment industry is exactly what makes it potentially vulnerable to illicit copying. Because DVDs store movies in a digital format that is perfectly reproducible every time movies are recorded and played on DVDs, for the first time one can view movies at home with crystal clarity and high quality audio. Additionally, the fact that the movies are stored digitally also means it is possible for movie companies, and others, to make virtually an infinite number of essentially perfect copies of DVD movies.

Such quality and ease of reproduction has made it extremely convenient for movie companies, for example, to send out thousands of pristine copies of first edition movies to members of the Academy of Motion Picture Arts and Sciences. These DVDs typically are intended to be viewed only by those individuals who vote for Oscars and other industry awards. However, many of the DVDs have fallen into unauthorized hands and have become the digital blueprint for bootleggers who have copied the DVDs and distributed them both online and in shops abroad. Many such films then show up in pirated DVD form, and the like, shortly after their release into the theaters—and sometimes sooner. Since it is preferable to continue to use a high quality digital medium, such as DVDs, to distribute motion pictures, providing a relatively high level of security to protect the content is desirable. Unfortunately, the illicit copies are of such high quality that movie companies, and the like often lose millions of dollars as a result. In addition, many other content owners in the entertainment industry remain reluctant to provide content on DVDs until such content protection is available. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The terms "coupled," and "connected," includes a direct connection between the things that are connected, or an indirect connection through one or more either passive or active intermediary devices or components.

The term "screener," includes media content, and the like, that is to be viewed/screened, and otherwise enjoyed by a user, member of an awards organization, and the like. The term "screener" may also include a content media, such as a DVD, high definition formatted DVD, and the like.

The meaning of "a," "an," and "the" include plural references. The meaning of "in" includes "in" and "on."

Briefly stated, the present invention is directed to a system, apparatus, and method for securely providing secure content viewable on a secure player by a selected user. In one embodiment, the secure player is configured to receive a computer readable medium, such as a DVD. However, the invention is not limited to DVDs. For example, it is envisioned that the invention may be configured to securely provide and view secure content on other mediums, including but not limited to high quality digital media, such as High Definition DVDs, and the like.

Illustrative Environment

Figure 1:
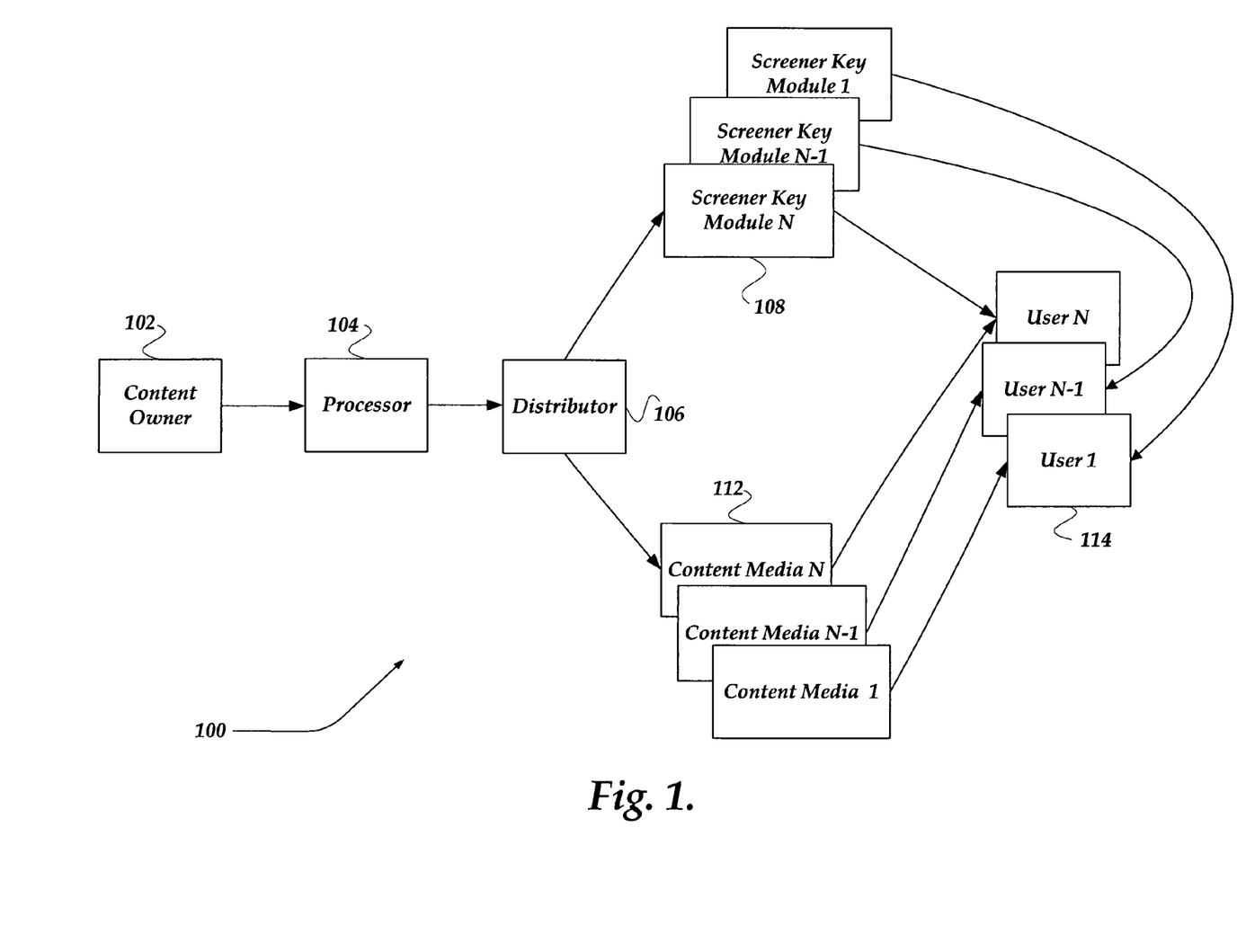
FIG. 1 illustrates an exemplary environment in which the present invention may be practiced.

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes content owner 102, processor 104, distributor 106, screener key module(s) 108 (1 through N), content media 112 (1 through N), and user(s) 114 (1 through N). Processor 104 is in communication with content owner 102 and distributor 106. Distributor 106 is also in communication with screener key module(s) 108 (1 through N) and content media 112 (1 through N). User(s) 114 (1 through N) are also in communication with screener key module(s) 108 (1 through N) and content media 112 (1 through N).

Content owner 102 includes producers, developers, and owners of media content that can be distributed to user(s) 114. Such content, sometimes called screeners, includes motion pictures, movies, videos, and the like. However, content owned by content owner 102 is not limited to video content only, and may include audio only services, without departing from the scope or spirit of the present invention. Thus, content is intended to include, but is not limited to, audio, video, still images, text, graphics, and other forms of content (screeners) directed towards user(s) 114.

Processor 104 receives content from content owner 102, selectively secures at least a portion of that content, and provides the secured content to distributor 106, as described in more detail below in conjunction with FIG. 5. Briefly, however, processor 104 creates and embeds in a stream of the received content, selected information, such as a content key for decryption, a content identifier, access constraints, rights, entitlements, and the like. In one embodiment, the selected information is packaged into at least one key package (not shown), each of which is encrypted employing at least one screener key. In another embodiment, each content key is encrypted employing at least one screener key. In one embodiment, the content identifier may be left in the clear.

The screener key(s) may be generated using any of a variety of encryption/decryption symmetric key mechanisms, including, but not limited to RSA algorithms, Data Encryption Standard (DES), International Data Encryption Algorithm (IDEA), Skipjack, RC4, Advanced Encryption Standard (AES), and the like. In one embodiment, the screener key(s) employ a 256-bit AES algorithm for the encryption/decryption of the key package. However, screener key(s) are not limited to symmetric key mechanisms, and asymmetric key mechanisms may also be employed without departing from the scope or spirit of the present invention.

Processor 104 may obtain the screener key(s) and content key(s) from a variety of sources, including, but not limited to, content owner 102, a trusted third party, and the like. Processor 104 may also generate the screener key(s) and/or content key(s) itself. Moreover, the screener keys may reside within a key storage (not shown). Each screener key may be indexed in the key storage by a content identifier that is associated with particular content. The key storage may further include access constraints, rights, and the like, associated with a user, content, a targeted secure player, any combination of user, content, and targeted secure player, and the like.

Distributor 106 includes businesses, systems, and the like that obtain rights from content owner 102 to copy and distribute the secure content. Distributor 106 may obtain the rights to copy and distribute from one or more content owners. Distributor 106 may repackage, store, and schedule secure content for subsequent sale, distribution, and license to other distributors, user(s) 114, and the like, using content media 112.

Distributor 106 may copy the secure content onto a variety of content media 112, including, but not limited to a DVD, high definition DVD, Video Compact Disc (VCD), Super VCD (SVCD), Super Audio CD (SACD), and the like. For example, secure content may be copied and distributed on a Dynamic Digital Sound (DDS) content media. Moreover, distributor 106 may also copy and distribute secure content on a Read/Write DVD, CD-Recordable (CD-R), and substantially similar content media. Distributor 106 is not limited to copying and distributing secure content on DVD and CD content media technologies, and virtually any other content media technology may be employed without departing from the scope of the present invention.

Distributor 106 may receive one or more screener keys associated with the one or more key packages. Distributor 106 may also receive authorization information from a variety of trusted sources that indicate whether a user has authorization to access the secure content. Provided that the user does have authorization, distributor 106 may package the received screener key(s) into screener key module 108. Distributor 106 may also include in screener key module 108 a content identifier associated with the secure content, fulfillment rights, access constraints, attributes associated with a targeted secure player, and the like. For example, distributor 106 may include in screener key module 108 attributes that indicate that the secure content is not playable within a selected geographic region.

Distributor 106 may further encrypt the screener key(s), and additional information included on screener key module 108, with a public key associated with the targeted secure player. The targeted secure player's public key may be generated employing a variety of asymmetric encryption mechanisms, including, but not limited to, Diffie-Hellman, RSA, Merkle-Hellman, PGP, X.509, and the like.

In one embodiment, distributor 106 employs a 2048-bit RSA asymmetric (public/private) key associated with the targeted secure player to encrypt the screener key(s). In another embodiment, the public/private key pair associated with the targeted secure player is generated in a Federal Information Processing Standard (FIPS) level 4 device. However, the present invention is not so limited, and another security level may be employed to generate the targeted secure player's public/private key pair.

In any event, the targeted secure player's public key may be made available to distributor 106 through a variety of approaches, including a trusted third party, a network, email, and the like. Moreover, the targeted secure player's private/public keys are bound to the targeted secure player such that they are unique to that particular targeted secure player. Moreover, the targeted secure player is configured to prevent removal of the targeted secure player's private key. Such action further binds the targeted secure player's private key to the targeted secure player.

Distributor 106 may distribute screener key module 108 to user(s) 114 employing a variety of mechanisms, including, but not limited to, a smart card, PCMCIA card, a memory stick, over a network, DVD, CD, tape, floppy disc, and similar removable mechanisms. Screener key module 108 may also be mailed to user(s) 114.

User(s) 114 include end-users, consumers of content, and the like. User(s) 114 further include members of an awards organization, and the like, that receive content (screeners) for review. User(s) 114 may employ various devices to enjoy the content, including but not limited to television appliances, mobile device, PDAs, personal computers, jukeboxes, and the like. User(s) 114 may further employ the secure player described in more detail below in conjunction with FIG. 2 to securely provide the content to the above devices.

User(s) 114 may request content media 112 directly from content owner 102, or at any point along a market stream (e.g., from distributor 106). Moreover, user(s) 114 may receive content media 112 through multiple content owners 102, distributors 106, and the like. User(s) 114 may further receive screener key module(s) 108 from content owner 102, distributor 106, and the like. User(s) 114 may also receive an identity module, described below in conjunction with FIG. 2, that provides user authentication and authorization for access to the secure content. User(s) 114 may employ screener key module(s) 108, and the identity module, to view the secure content on content media 112.

Figure 2:
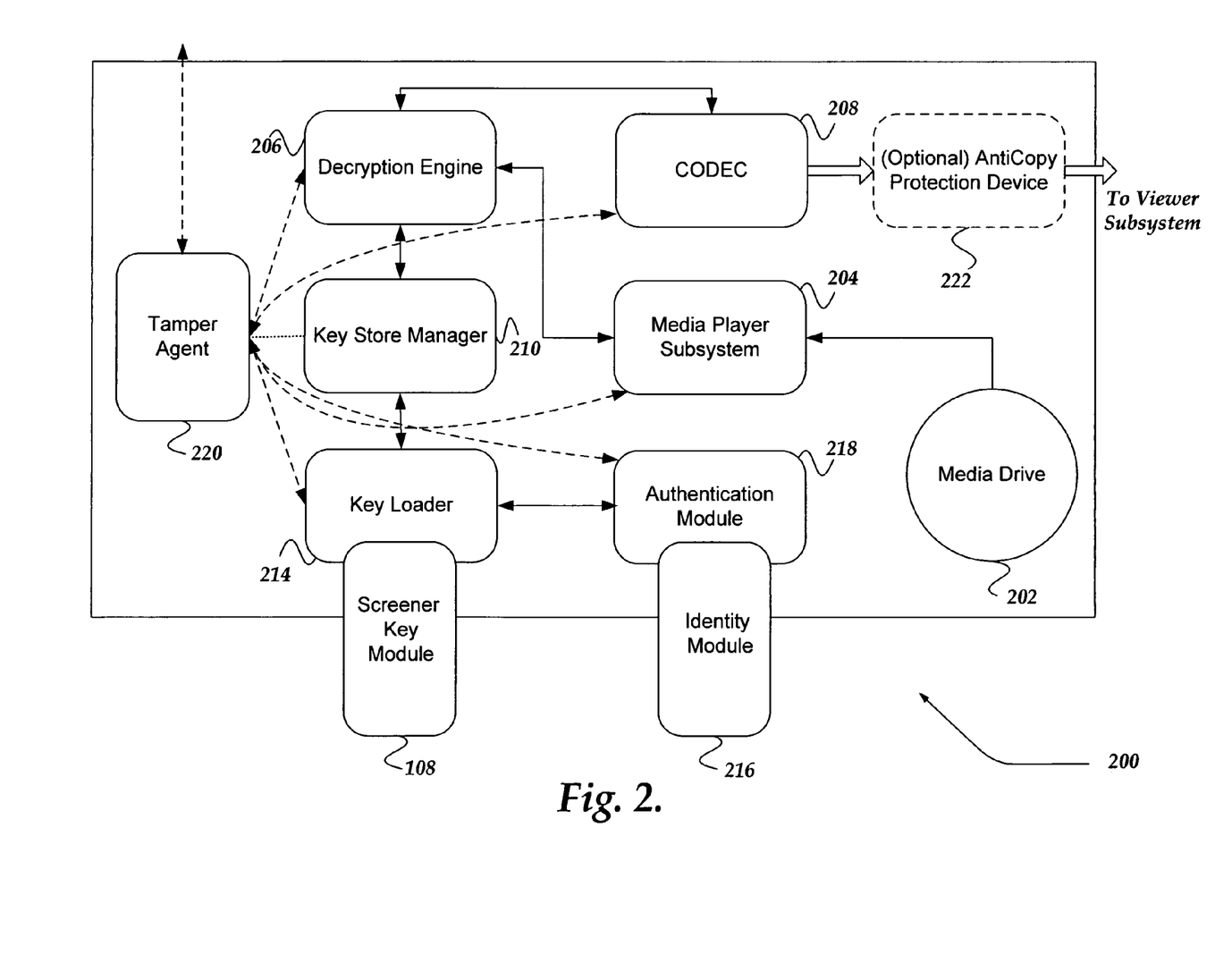
FIG. 2 illustrates a block diagram of an exemplary apparatus for enabling the viewing of secure content.

FIG. 2 illustrates a block diagram of an exemplary apparatus for enabling the viewing of secure content. Briefly, secure player 200 is configured to receive content media 112 and screener key module 108 of FIG. 1, and an identity module, and to enable viewing of the secure content on content media 112. As such, secure player 200 may be employed by user(s) 114 within, or coupled to a television appliance, digital recorder, set-top-box, cellular phone, mobile device, PDA, personal computer, jukebox, hybrid Internet-music-player/home-stereo-component-system, and the like.

As shown in FIG. 2, secure player 200 may include many more components than those shown; however, those shown are sufficient to disclose an illustrative embodiment for practicing the invention.

As shown in the figure, secure player 200 includes media drive 202, media player subsystem 204, decryption engine 206, COmpresser/DECompresser (CODEC) 208, key store/manager 210, screener key module 108, key loader 214, identity module 216, authentication module 218, tamper agent 220, and (optional) analog copy protection device 222. Components numbered similarly to those in FIG. 1 operate in a substantially similar manner.

Media player subsystem 204 is in communication with media drive 202 and decryption engine 206. Decryption engine 206 is also in communication with CODEC 208 and key store/manager 210. CODEC 208 is in communication with optional anticopy protection device 222. Key store/manager 210 is further in communication with key loader 214. Key loader 214 is in communication with screener key module 108 and authentication module 218. Authentication module 218 is also in communication with identity module 216. Tamper agent 220 is in communication with decryption engine 206, CODEC 208, key store/manager 210, media player subsystem 204, authentication module 218, and key loader 214.

Media drive 202 includes virtually any device and related software that is configured to receive content media 112 of FIG. 1. Such devices include, but are not limited to, a DVD drive, high definition DVD drive, Super Video CD (SVCD) drive, VCD drive, Super Audio CD (SACD) drive, and other content media devices. For example, media drive 202 may also be Dynamic Digital Sound (DDS) drive. Moreover, media drive 202 may also support write capabilities, such as through a DVD/RW drive, and the like. Media drive 202 and media player subsystem 204 however, are not limited to DVD, and CD technologies, and virtually any other content media technology may be employed without departing from the scope of spirit of the present invention.

Media player subsystem 204 operates in conjunction with media drive 202 to take secure content from the content media supported by media drive 202, and provide it to decryption engine 206. Moreover, media player subsystem 204 and media drive 202 may include the capabilities to enable content media to be erased, destroyed, written over, and the like. For example, media player subsystem 204 may enable the erasure, destruction, disablement, and the like, of the secure content on the content media after a predetermined number of viewings, e.g. a single viewing, indication of unauthorized activity, and the like.

CODEC 208 includes any of a variety of compression/decompression mechanisms configured to receive compressed content and decompress it into a format capable of being rendered for the user's enjoyment. For example, CODEC 208 may employ Moving Pictures Experts Group (MPEG), Joint Photographic Experts Group (JPEG), wavelets, and other mechanisms for compression and decompression of received content.

Key loader 214 is enabled to receive a request to retrieve a screener key from screener key module 108. Key loader 214 may evaluate the request to determine whether the user has sufficient authorization to retrieve the screener key. Key loader 214 may request such authorization from authentication module 218. Key loader 214 may provide authentication module 218 a content identifier, or other information as part of its request for authorization. Additionally, key loader 214 may receive a request to load one or more screener keys, and other information, onto screener key module 108. Again, key loader 214 may seek authorization for such action from authentication module 218.

Authentication module 218 is configured to authenticate a user and to provide authorized access to screener key module 108. Authentication module 218 may receive a request from key loader 214 to access a screener key residing on screener key module 108. Authentication module 218 may also receive a request to store information on screener key module 108. In any event, authentication module 218 employs identity module 216 to determine the user's identity and associated authorization for access to screener key module 108.

Identity module 216 is enabled to provide the identity of a user, and entitlements and rights associated with a content identifier, user, and the like. Identity module 216 may be deployed using a variety of mechanisms, including, but not limited to, biometric, smart card, user name/password, touch-pad code entry, and the like. In one embodiment, identity module 216 is configured to enable virtually any user of secure player 200 to be authenticated to virtually any secure content.

Key store/manager 210 is configured to store and manage encryption/decryption keys, including screener keys, secure player 200's public/private keys, associated information, and the like. The associated information may include entitlements, rights, and the like, associated with at least one of a screener key, user, content, any combination of screener key, user, and content, and the like. Key store/manager 210 may include a database or flat data file, and the like, configured to store and manage the keys, and the associated information in a secure manner. Key store/manager 210 may employ content identifiers to index the screener keys and associated information.

Key store/manager 210 typically securely retains the secure player 200's private/public keys until decryption engine 206 requests them for decryption/encryption of a screener key. Key store/manager 210, however, is configured to ensure that the secure player's private key is not made available beyond use within secure player 200.

Key store/manager 210 securely stores received screener keys until decryption engine 206 requests them for decryption of encrypted content. Key store/manager 210 may retrieve a screener key from screener key module 108 by making a request to key loader 214. Key store/manager 210 may also direct key loader 214 to deactivate screener key module 108 when a screener key has been retrieved from it. Key store/manager 210 may further direct key loader 214 to erase, or otherwise disable, a screener key on screener key module 108, based on an event, such as a pre-determined number of viewings of the associated secure content, unauthorized activity, and the like.

Key store/manager 210 may also employ secure player 200's public key to encrypt a screener key that is to be loaded onto screener key module 108.

Decryption engine 206 is configured to receive a stream of content units from media player subsystem 204. Upon receipt of at least one content unit, decryption engine 206 may make a determination whether the content unit is encrypted. Where a content unit is encrypted, decryption engine 206 may extract one or more key packages from the content stream. Decryption engine 206 may request a screener key from key store/manager 210 to decrypt the key package to, in turn, enable the extraction of one or more content keys associated with the encrypted content unit. Decryption engine 206 employs the one or more content keys to decrypt the encrypted content unit. Decryption engine 206 may further provide the decrypted content unit to CODEC 208.

(Optional) anticopy protection device 222 enables additional protections of decompressed content by scrambling, dirtying, and otherwise encrypting the decompressed content prior to providing it to a descrambler device, and the like. As such anticopy protection device 222 enables a level of protection of the content after it leaves secure player 200.

Tamper agent 220 is enabled to monitor the components in secure player 200, to determine whether any component, including secure player 200, itself, is being tampered with, or otherwise associated with an unauthorized activity. In one embodiment, tamper detection & response protection device 220 operates at least at a FIPS security level 3.

Tamper agent 220 may provide a response based on the results of its monitoring. Such responses may include directing the erasing or otherwise disabling the secure content, locking secure player 200 from an operation, erasing of secure player's public/private keys, screener keys, content keys, and the like, and reporting the detected unauthorized activity.

Figure 3:
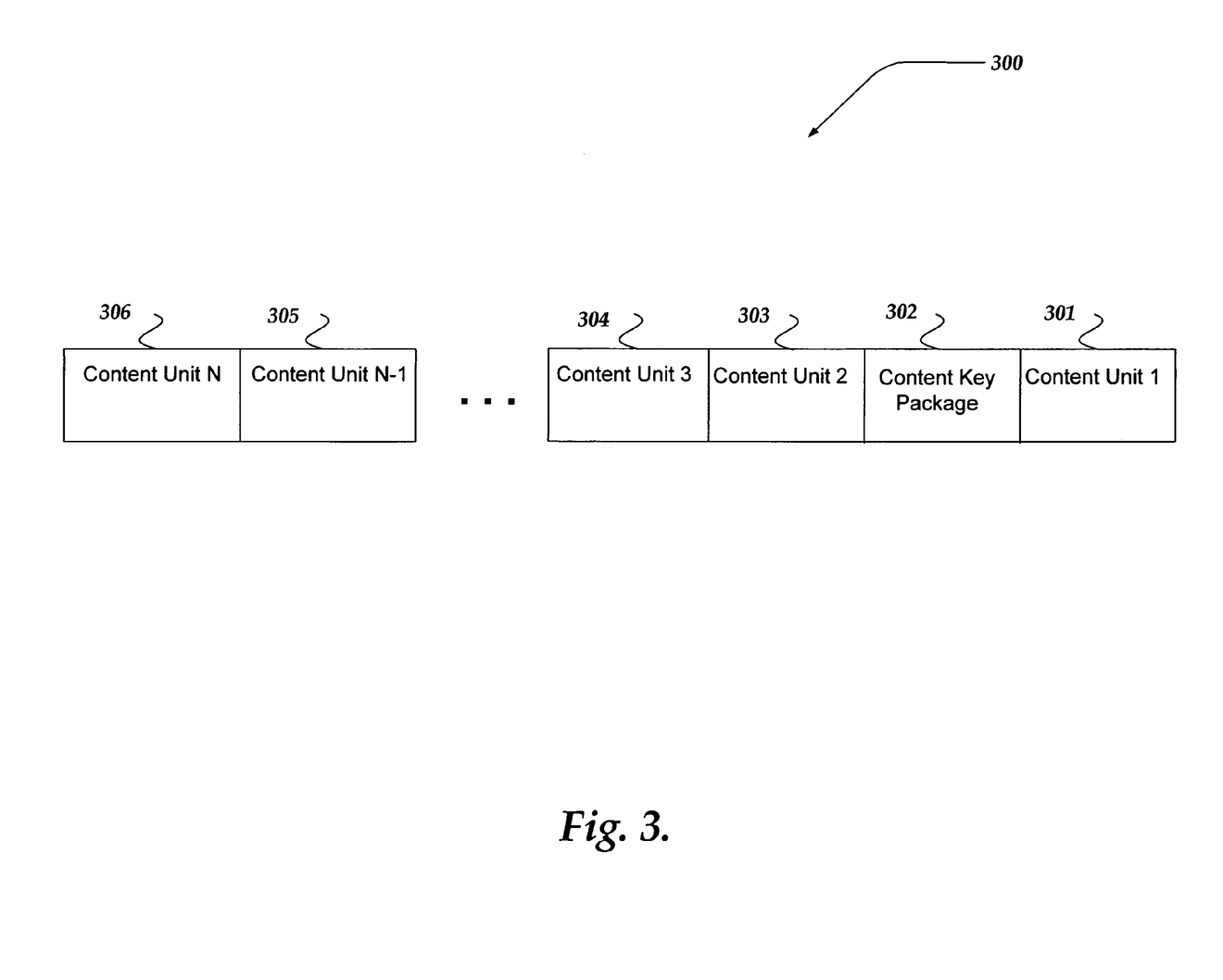
FIG. 3 illustrates one embodiment of a content stream for providing secure content.

FIG. 3 illustrates one embodiment of a content stream for providing secure content. Content stream 300 is only one example of a suitable stream of content and is not intended to suggest any limitation as to the scope of use or functionality of the present invention. Thus, other well-known structures and configurations may be employed without departing from the scope of the present invention.

As shown in the figure, content unit stream 300 includes content units 301, 303–306, and key package 302. Although, only one key package (302) is illustrated, it is noted that content stream 300 may include virtually any number of key packages.

Content units 301, and 303–306 may include a variety of content formats. For example, content may be formatted employing Motion Pictures Expert Group (MPEG) format. Content units 301, and 303–306 are not limited to MPEG content formats, and other content formats, including JPEG formats, MP3 formats, and the like, may be employed without departing from scope or spirit of the present invention. However, the MPEG format is employed herein as an example and for ease of illustration.

Briefly, MPEG is an encoding and compression standard for digital broadcast content. MPEG provides compression support for television quality transmission of video broadcast content. Moreover, MPEG provides for compressed audio, control, and even user broadcast content.

MPEG content streams include packetized elementary streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames include intra-frames (I-frames), forward predicted frames (P-frames), and bi-directional predicted frames (B-frames).

Content units 301, and 303–306 each may include a portion of the content stream that is partitioned into units of data based on a variety of criteria. For example, content units 301, and 303–306 may include portions of data extracted from the video elementary stream (ES), the audio ES, the digital data ES, and any combination of video, audio, data elementary streams of the content stream. For example, content units 301, and 303–306 may be composed of ten second portions of a video ES. Moreover, content units 301, and 303–306 need not include the same length, density, and the like, of content from the content stream.

Content units 301, and 303–306 may be selectively encrypted using one or more content keys. That is, content units 301 and 303 may be encrypted, while content units 304–306 are left in the clear. Additionally, encryption may be selectively applied to at least a portion of the video elementary stream (ES), the audio ES, the digital data ES, and any combination and any portion of video, audio, data elementary streams that comprise content stream 300. Selective encryption may further include selectively encrypting at least a portion of an I-frame, P-frame, B-frame, and any combination of P, B, and I frames.

Key package 302 may include one or more content keys used to encrypt content units, and a content identifier associated with a content stream 300. The key package 302 may also include access constraints, entitlements, and the like, associated with content stream 300. Key package 302 may further include synchronization information that indicates which content key is associated with which content unit (301, 302–306) of content stream 300.

Key package 302 may be encrypted employing a targeted secure player's public/private key. In one embodiment, the targeted secure player's public/private keys are generated in a FIPS level 4 device. However, the present invention is not so limited, and lower security levels may be employed to generate the target secure player's public/private keys. In one embodiment, key package 302 is left in the clear, and only the content key(s) are encrypted with the targeted secure player's public/private key.

Generalized Operation

The operation of certain aspects of the present invention will now be described with respect to FIGS. 4–6.

Figure 4:
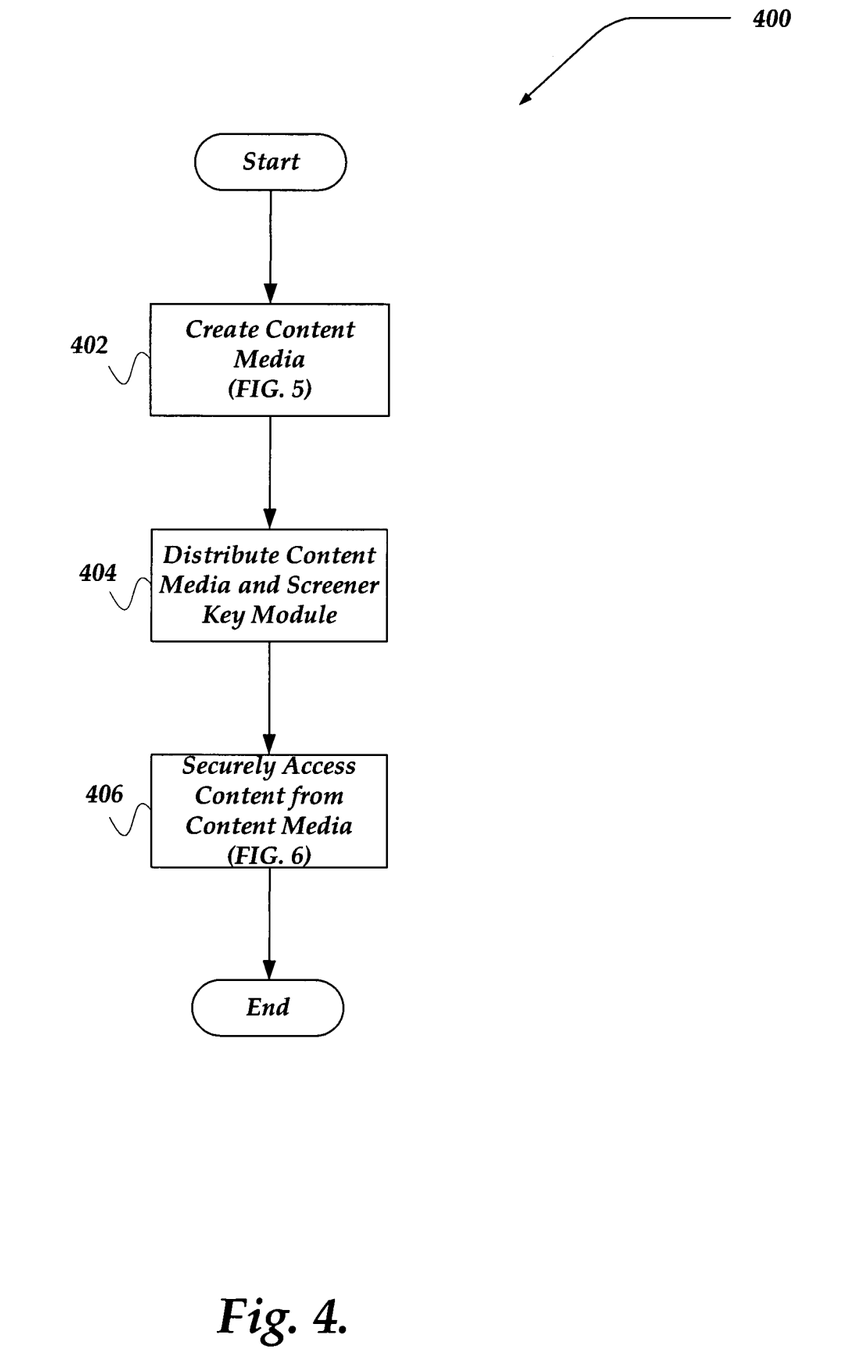
FIG. 4 illustrates a flow diagram generally showing one embodiment for an end-to-end process of providing and viewing secure content.

FIG. 4 illustrates a flow diagram generally showing one embodiment for an end-to-end process of providing and viewing secure content. Process 400 may operate, for example, within operating environment 100 in FIG. 1.

Process 400 begins, after a start block, at block 402. Block 402 is described in more detail below in conjunction with FIG. 5. Briefly, however, at block 402 secure content is created, by selectively encrypting at least one content unit within a content stream. The selective content unit is encrypted employing at least one content key. The employed content key(s), along with additional information, may be further encrypted and embedded within the content stream. The modified content stream is transferred to a content media, such as content media 112 in FIG. 1.

Processing proceeds to block 404 where the content media and key package are distributed to a user, such as user(s) 114 in FIG. 1. The content media may be distributed employing a variety of mechanisms, including mail, and the like. The screener key module may include a memory stick, a smart card, a DVD, disk, tape, and the like. The screener key module may be distributed to the user through a different distribution mechanism than employed for the content media. The screener key module may be distributed, for example, by employing the hard media described above, by transmission over a network, by mail, and by a variety of other distribution mechanisms.

Processing continues to block 406, which is described in more detail below in conjunction with FIG. 6. Briefly, however, at block 406, a secure player, together with the screener key module, and an identity module, are employed to decrypt and view the content stream located on the content media. Upon completion of the actions at block 406, processing returns to processing other actions.

Figure 5:
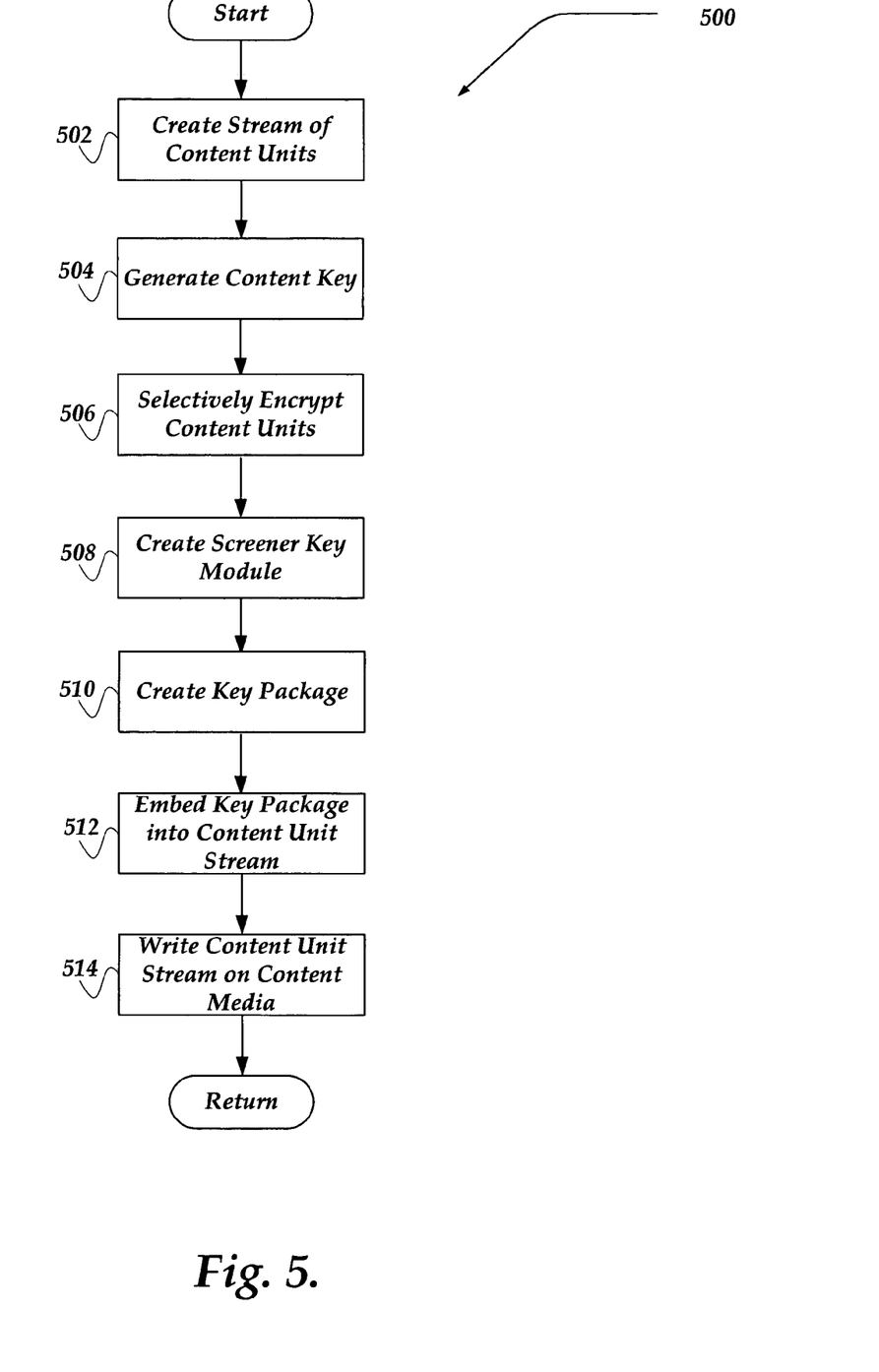
FIG. 5 illustrates a flow diagram generally showing one embodiment for a process of generating secure content.

FIG. 5 illustrates a flow diagram generally showing one embodiment for a process of generating secure content. Process 500 may operate, for example, within operating environment 100 in FIG. 1.

Process 500 begins, after a start block, at block 502, where a stream of content units is created. A content owner, producer, and the like, may create the stream of content units, by subdividing a content stream into units of data based on a variety of criteria, as described above in conjunction with FIG. 3.

Processing proceeds to block 504, where at least one content key is generated. A content key may be generated employing any of a number of encryption/decryption symmetric mechanisms, including, but not limited to Advanced Encryption Standard (AES), RSA, RC6, IDEA, DES, RC2, RC5, Skipjack, and any other symmetric encryption algorithm. Moreover, such encryption algorithms may use, where appropriate, cipher block chaining mode, cipher feedback mode, CBC cipher text stealing (CTS), CFB, OFB, counter mode, and/or any other block mode. In one embodiment, content keys are generated employing an at least 128 bit AES encryption/decryption algorithm. However, content key generation is not limited to symmetric key mechanisms, and asymmetric key mechanisms may also be employed without departing from the scope of the present invention.

Processing continues to block 506, where at least one content key is employed to selectively encrypt a content unit in the content stream. Selective encryption may include selecting a content unit at random in the content stream for encryption, selecting every N/th content unit in the content stream, and the like. Selective encryption may also include selectively encrypting at least a portion of the content unit, such as at least a portion the video elementary stream (ES), the audio ES, the digital data ES, and any combination of video, audio, data elementary streams in the content unit. Selective encryption may further include encrypting a frame in the content unit, such as the I-frame, P-frame, B-frame, and any combination of P, B, and I frames of the content unit.

Moreover, selective encryption may further include varying the content key employed to encrypt selected content units. For example, in one embodiment, a set of content keys is rotated through on some basis, such as every ten seconds, to encrypt the content units.

Processing next proceeds to block 508, where a screener key module is created. The screener key module may include a content identifier associated with the content and a screener key. The screener key module may also include entitlements, rights and the like associated with the content. Moreover, the screener key may be encrypted employing a public/private key that is bound to the targeted secure player.

Processing continues to block 510, where a key package is created. The key package may include at least one content key, a content identifier associated with the content, access constraints, entitlements, and the like, substantially as described above in conjunction with FIG. 3. In one embodiment, the at least one content key is encrypted using the screener key. In another embodiment, the key package is encrypted. In still another embodiment, the content identifier associated with the content remains unencrypted.

Processing continues to block 512, where the key package is embedded into the content unit stream. Processing proceeds to block 514, where the modified content units are written to a content media, such as a DVD, high definition DVD, and the like. Upon completion of block 514, processing returns to perform other actions.

It is understood that several blocks of FIG. 5 can be implemented in a different sequence, combination of sequences, and the like, without departing from the scope or spirit of the present invention. For example, block 506 may be performed prior to, or even in combination with, block 504.

Figure 6A:
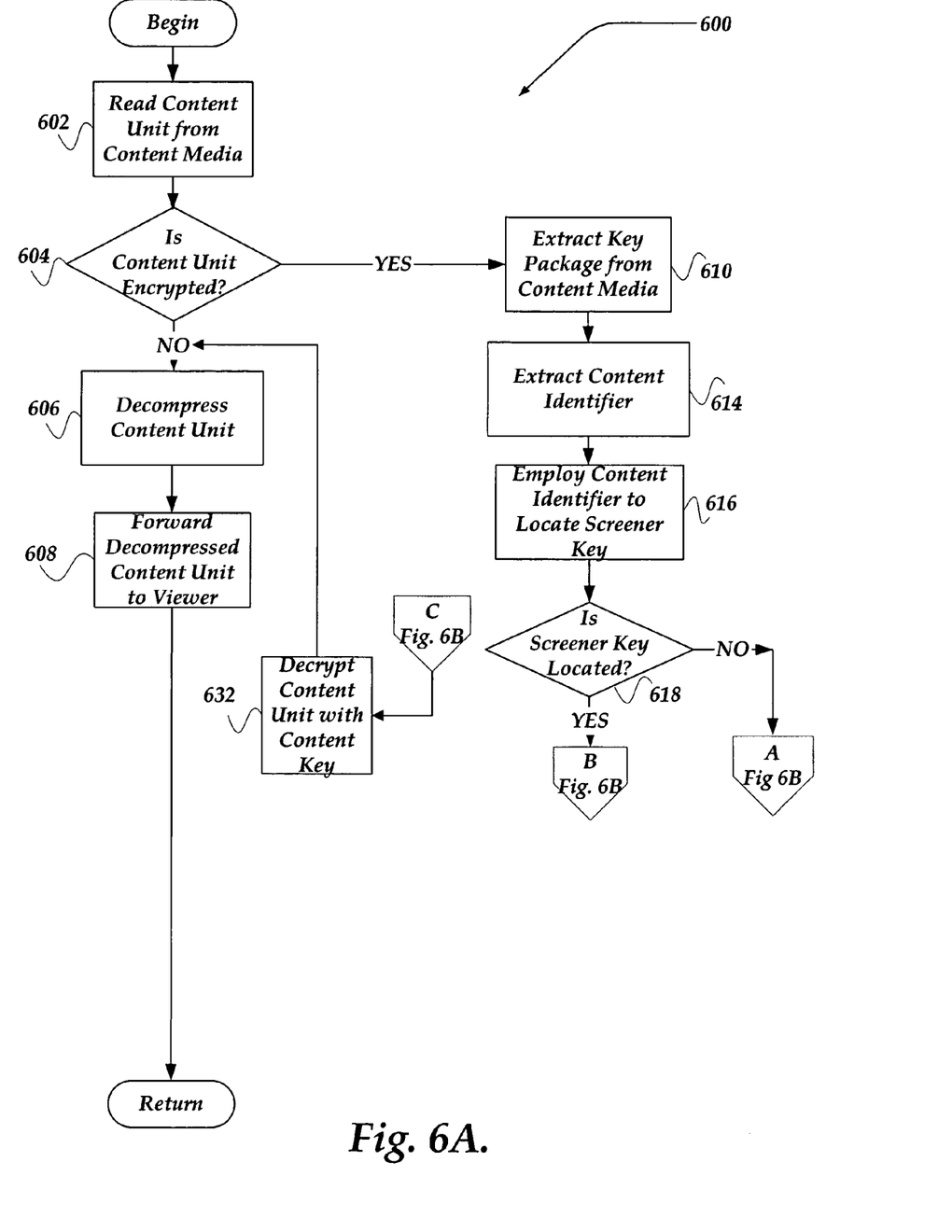
FIGS. 6A–6B illustrate a flow diagram generally showing one embodiment for a process of viewing secure content, in accordance with the present invention.
Figure 6B:
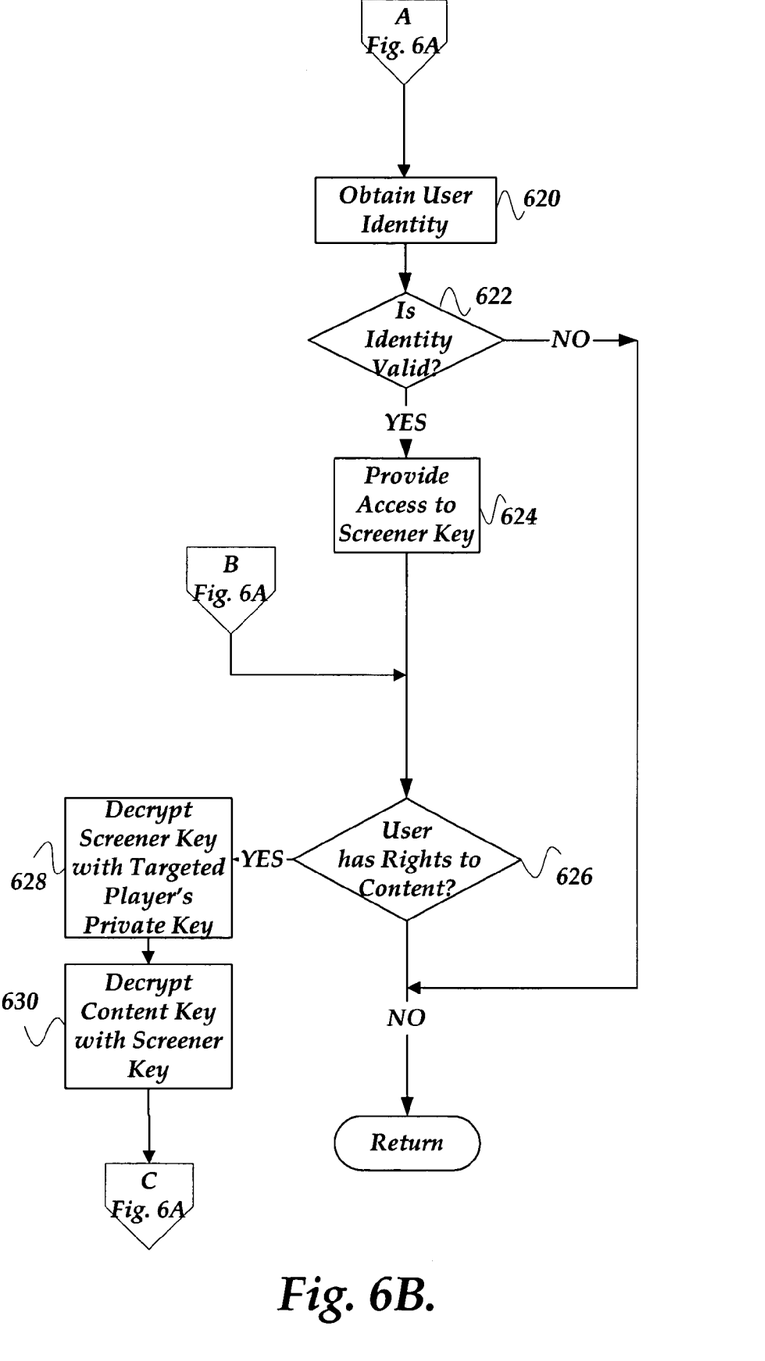

FIGS. 6A–6B illustrate a flow diagram generally showing one embodiment for a process of viewing secure content. Process 600 may operate, for example, within secure player 200 of FIG. 2.

Process 600 begins, after a start block, at block 602, where a content unit is read from a content media. Processing proceeds to decision block 604, where a determination is made whether the read content unit is encrypted. If it is determined that the read content unit is encrypted, processing branches to block 610; otherwise, processing branches to block 606.

At block 610, a key package is extracted from the content stream on the content media. Processing continues to block 614, where a content identifier is extracted from the key package. In one embodiment, the content identifier is already "in the clear." Processing proceeds to block 616, where the content identifier is employed as an index to locate a screener key associated with the secure content.

Processing continues to decision block 618, where a determination is made whether a screener key associated with the content identifier is located in an existing database, file, directory, and the like, of existing screener keys. If a screener key is not located, processing branches to block 620; otherwise, processing branches to decision block 626.

At block 620, a request is made to obtain a user identity for authorizing access to a screener key module. The request may require entering a user name/password, a biometric entry, and the like. In one embodiment, the request may require the user to insert a smart card that includes an identification key. Processing continues to decision block 622, where a determination is made whether the received identity is valid. If the received identity is valid, processing branches to block 624; otherwise, processing returns to perform other actions. In one embodiment, such other actions, may include, but is not limited to, enabling the user to attempt to re-enter a valid identity, erasing the content media, locking the user from access of the content media, and the like.

At block 624, the valid user identity is employed to enable access to the screener key located on a screener key module. Processing continues to decision block 626.

At decision block 626, a determination is made whether the validated user has appropriate access rights, entitlements, and the like, to the content unit. If so, processing branches to block 628; otherwise, processing returns to perform other actions, such as described above, at decision block 622.

At block 628, the screener key is decrypted using the private key that is bound to the targeted secure player. Processing continues to block 630, where the decrypted screener key is employed to decrypt the content key. In one embodiment, the decrypted screener key is employed to decrypt the key package and extract the content key. Processing continues to block 632, where the decrypted content key is employed to decrypt the encrypted content unit. Processing continues to block 606.

At block 606, a CODEC is employed to decompress the current content unit. Processing then proceeds to block 608, where the decompressed content is provided to a device, such as a television, and the like, for user enjoyment. In one embodiment, at block 608, the decompressed content is further copy protected. Thus, the decompressed content may be passed through an optional anticopy protection device, prior to forwarding the decompressed content. Upon completion of the actions at block 608, the process returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A system for securely playing a content stream, comprising:
   (a) a processor that is arranged to perform actions, including:
      (1) selectively encrypting at least a portion of the content stream using a content key;
      (2) encrypting the content key using a screener key; and
      (3) encrypting the screener key using a public key; and
   (b) a player that is arranged to receive the selectively encrypted content stream and encrypted screener key, and to perform actions, including:
      (1) decrypting the encrypted screener key using a private key associated with the public key, wherein the public key and the private key are bound to the player such that the public key and the private key are unique to the player;
      (2) decrypting the encrypted content key using the screener key; and
      (3) decrypting the selectively encrypted content stream using the content key.

2. The system of claim 1, wherein the player is arranged to perform actions, further comprising, employing a user identity to enable access to the encrypted screener key.

3. The system of claim 1, wherein the player further comprises:
   (a) an authentication module that is arranged to perform actions, including:
      receiving a user identity;
      authenticating the received user identity;
      determining an authorization associated with the user identity; and
      if the user identity is authorized to access the encrypted screener key, enabling the encrypted screener key to be retrieved.

4. The system of claim 1, wherein the encrypted screener key resides on at least one of a smart card, PCMCIA card, memory stick, DVD, CD, tape, and a floppy disc.

5. The system of claim 1, wherein selectively encrypting at least a portion of the content stream further comprises encrypting at least a portion of at least one of a video elementary stream (ES), audio ES, intra-frames (I-frames), forward predicted frames (P-frames), and bi-directional predicted frames (B-frames).

6. The system of claim 1, wherein selectively encrypting at least a portion of the content stream further comprises employing another content key to encrypt at least another portion of the content stream.

7. The system of claim 1, wherein selectively encrypting at least a portion of the content stream further comprises rotating through a plurality of content keys, each of which is employed to selectively encrypt a different portion of the content stream.

8. The system of claim 1, wherein the processor is arranged to perform further actions, including:
   creating a key package that includes the encrypted content key; and
   embedding the key package into the content stream.

9. An apparatus for securely playing content, comprising:
   (a) a loader configured to receive a screener key associated with a selectively encrypted content stream, wherein the screener key is encrypted using a public key that is bound to the apparatus such that the public key is unique to the apparatus; and (b) a decryption engine, coupled to the loader, that is configured to perform actions, including:
  (1) receiving the selectively encrypted content stream;
  (2) employing the loader to retrieve the screener key;
  (3) decrypting the screener key using a private key associated with the public key, wherein the private key is constrained to the apparatus; and
  (4) employing the screener key to decrypt a content key, wherein the content key enables decryption of the selectively encrypted content stream.

10. The apparatus of claim 9, wherein the loader is configured to perform actions, further comprising:
  (a) receiving a request for access to the screener key from the decryption engine;
  (b) requesting authorization to provide access, from an authentication module; and
  (c) if authorization is received, providing the encrypted screener key to the decryption engine.

11. The apparatus of claim 9, wherein the loader is further configured to store another screener key on a screener key module.

12. The apparatus of claim 11, wherein the screener key module comprises at least one of a smart card, PCMCIA card, memory stick, DVD, CD, tape, and a floppy disc.

13. The apparatus of claim 9, wherein the private key and public key associated with the apparatus are generated by a Federal Information Processing Standard (FIPS) level 4 device.

14. The apparatus of claim 9, further comprising a tamper agent configured to monitor for an unauthorized action and, if an unauthorized action is detected, to provide a response to the unauthorized action.

15. The apparatus of claim 14, wherein the response to the unauthorized action further comprises at least one of erasing the selectively encrypted content stream, locking the apparatus from an operation, erasing the private key, erasing the screener key, and reporting the unauthorized action.

16. A method for creating secure content for use in a player, the method comprising:
  (a) selectively encrypting at least a portion of a content stream using a content key;
  (b) generating a key package comprising the content key;
  (c) encrypting the key package using a screener key;
  (d) encrypting the screener key employing a public key bound to the player such that the public key is unique to the player;
  (e) embedding the encrypted key package into the selectively encrypted content stream.

17. The method of claim 16, further comprising, copying the selectively encrypted content stream including the embedded key package onto a content media.

18. The method of claim 17, wherein the content media further comprises at least one of a DVD, high definition DVD, Video Compact Disc (VCD), Super VCD (SVCD), Super Audio CD (SACD), Dynamic Digital Sound (DDS) media, Read/Write DVD, and a CD-Recordable (CD-R).

19. The method of claim 16, wherein the content key is generated employing a encryption/decryption algorithm comprising at least one of Advanced Encryption Standard (AES), RSA, International Data Encryption Algorithm (IDEA), and Data Encryption Standard (DES) algorithm.

20. The method of claim 16, wherein the key package further comprises at least one of synchronization information that indicates a relationship between the content key and the selectively encrypted content stream, and a content identifier associated with the content stream.

21. The method of claim 16, wherein the key package further comprises a content identifier associated with the content stream, wherein the content identifier remains unencrypted.

22. The method of claim 16, further comprising, storing the encrypted screener key in a screener key module, wherein the screener key module is removable from the player.

23. The method of claim 16, wherein the screener key module further comprises at least one of a content identifier associated with the selectively encrypted content stream, an access constraint, and a fulfillment right.

24. The method of claim 16, wherein selectively encrypting at least a portion of a content stream further comprises selecting for encryption at least a portion of at least one of a video elementary stream (ES), audio ES, intra-frames (I-frames), forward predicted frames (P-frames), and bi-directional predicted frames (B-frames).

25. The method of claim 16, wherein the screener key is generated employing a encryption/decryption algorithm comprising at least one of an Advanced Encryption Standard (AES), RSA, International Data Encryption Algorithm (IDEA), Skipjack, RC4, and a Data Encryption Standard (DES) algorithm.

26. The method of claim 16, wherein selectively encrypting at least a portion of a content stream further comprises partitioning the content stream into content units.

27. A method for securely playing a content stream, comprising:
  (a) receiving the content stream, wherein the content stream comprises at least one selectively encrypted content unit;
  (b) receiving a key package, wherein the key package is encrypted using a screener key;
  (c) retrieving the screener key, wherein the retrieved screener key is encrypted using a public key;
  (d) decrypting the retrieved screener key using a private key associated with the public key wherein the private key is constrained to a content stream player such that the public key and the private key are unique to the content stream player;
  (e) decrypting the key package using the decrypted screener key; and
  (f) decrypting at least one selectively encrypted content unit using the decrypted content key.

28. The method of claim 27, wherein the decrypted content unit comprises a compressed content unit, further comprising, decompressing the compressed content unit.

29. The method of claim 27, wherein retrieving the screener key further comprises, determining an authorization to retrieve the screener key.

30. The method of claim 27, wherein the selectively encrypted content unit further comprises at least a portion of at least one of a video elementary stream (ES), audio ES, intra-frames (I-frames), forward predicted frames (P-frames), and bi-directional predicted frames (B-frames).

31. The method of claim 27, wherein the screener key is generated employing a encryption/decryption algorithm comprising at least one of an Advanced Encryption Standard (AES), RSA, International Data Encryption Algorithm (IDEA), Skipjack, RC4, and a Data Encryption Standard (DES) algorithm.

32. A computer-readable medium encoded with a data structure for use in securing content, the data structure comprising:
  a first data field comprising at least one selectively encrypted content unit from a content stream;

a second data field comprising a key package, wherein the key package comprises at least one content key for decrypting the at least one selectively encrypted content unit, and a content identifier associated with the content stream, wherein the at least one content key is encrypted using a screener key, the screener key being encrypted using a public key bound to a targeted player such that the public key is unique to the targeted player.

33. The computer-readable medium of claim 32, wherein the key package further comprises an access constraint associated with the content stream.

34. The computer-readable medium of claim 32, wherein the second data field is interspersed between at least two content units.

35. The computer-readable medium of claim 32, wherein the content key is generated employing a encryption/decryption algorithm comprising at least one of Advanced Encryption Standard (AES), RSA, International Data Encryption Algorithm (IDEA), and Data Encryption Standard (DES) algorithm.

36. The computer-readable medium of claim 32, wherein the key package further comprises synchronization information that indicates a relationship between at least one content key and the selectively encrypted content unit.

37. The computer-readable medium of claim 32, wherein the selectively encrypted content unit further comprises at least a portion of at least one of a video elementary stream (ES), audio ES, intra-frames (I-frames), forward predicted frames (P-frames), and bi-directional predicted frames (B-frames).

38. The computer-readable medium of claim 32, wherein the content stream further comprises a plurality of content units, at least one content unit being of a different length.

* * * * *

UNITED STATES PATENT AND TRADEMARK OFFICE
CERTIFICATE OF CORRECTION

PATENT NO. : 7,007,170 B2
APPLICATION NO. : 10/760642
DATED : February 28, 2006
INVENTOR(S) : Glenn A. Morten It is certified that error appears in the above-identified patent and that said Letters Patent is hereby corrected as shown below:

In the Application:

First Page Col. 2 (Attorney, Agent, or Firm), Line 1, Delete "PC;" and insert -- P.C.; --.

Page 2 Col. 1 (U.S. Patent Documents), Line 47, Delete "B1" and insert -- B2 --.

Page 2 Col. 1 (U.S. Patent Documents), Line 53, Delete "B1" and insert -- B2 --.

Page 2 Col. 2 (U.S. Patent Documents), Line 5, Delete "B1" and insert -- B2 --.

Page 2 Col. 2 (U.S. Patent Documents), Line 9, Delete "B1" and insert -- B2 --.

Page 2, Col. 2 (Other Publications), Line 29, Delete "Immage" and insert -- Image --.

Column 2, Line 20, Delete "EMBODIMENT" and insert -- EMBODIMENTS --.

Column 2, Line 54, Delete "computer readable" and insert -- computer-readable--.

Signed and Sealed this

First Day of August, 2006

JON W. DUDAS
*Director of the United States Patent and Trademark Office*